United States Patent Office 3,567,556
Patented Mar. 2, 1971

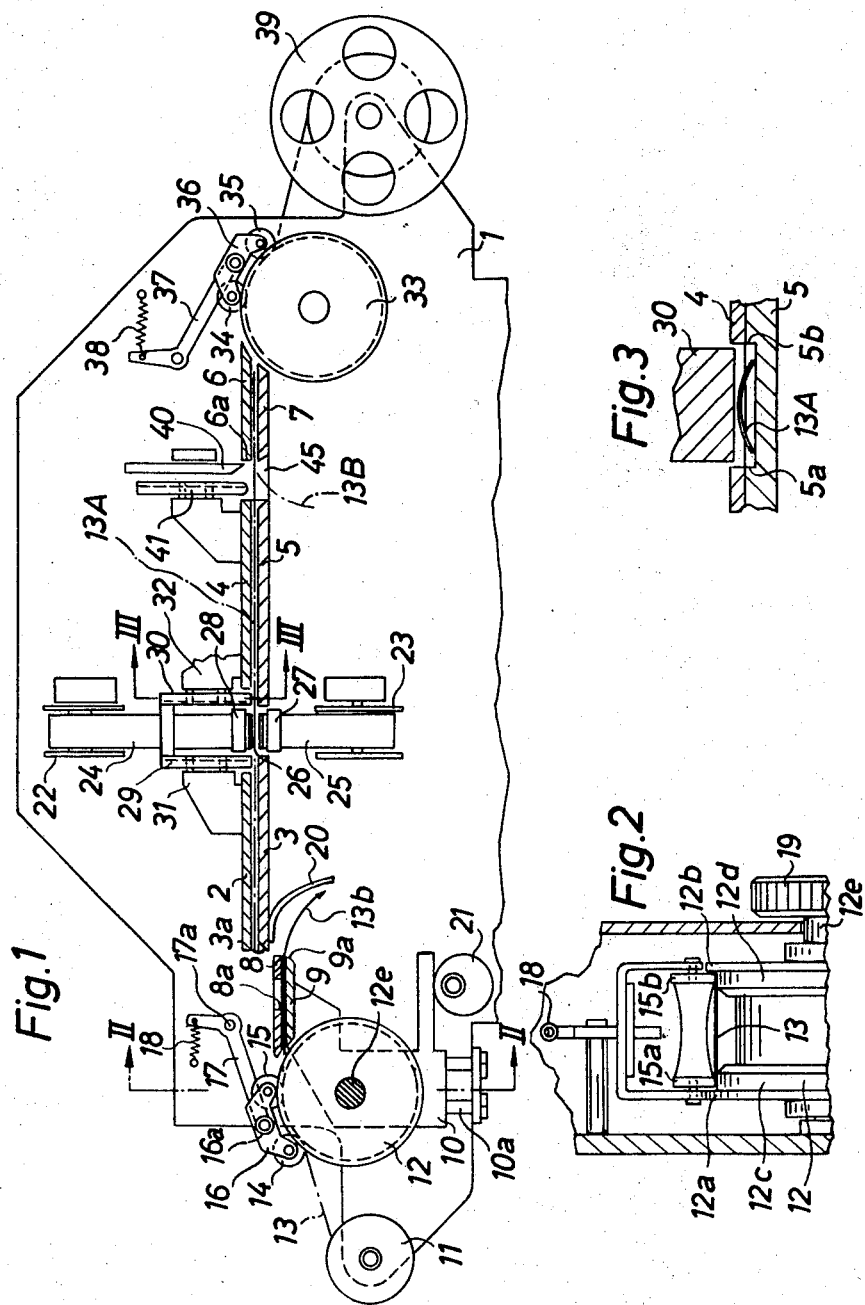

3,567,556
APPARATUS OR TRIMMING AND SPLICING STRIPS OF ROLL FILM OR THE LIKE
Michael Fensterl, Munich, Germany, assignor to Agfa-Gevaert Aktiengesellschaft, Leverkusen, Germany
Filed Sept. 25, 1967, Ser. No. 670,287
Claims priority, application Germany, Sept. 30, 1966, A 26,446
Int. Cl. B31f 5/00
U.S. Cl. 156—505
11 Claims

ABSTRACT OF THE DISCLOSURE

Apparatus for splicing strips of roll film or the like end-to-end and for trimming the leading and trailing ends of strips prior to splicing. The trailing end of a preceding strip is trimmed between the splicing station and a take-up reel and is thereupon moved backwards to the splicing station. The leading end of a following strip is trimmed prior to transport into abutment with the trimmed trailing end of the preceding strip. In order to flatten the strips, the apparatus comprises a pair of guide rollers which are respectively disposed upstream and downstream of the splicing station and each of which cooperates with pressing rolls which bias the strips against the peripheral surfaces of the respective guide rollers and prevent longitudinal buckling or curling of strips. The leading end of a following strip is trimmed in response to upward movement of a carriage for the corresponding guide roller and the trailing end of the preceding strip is trimmed by an auxiliary trimming device located between the splicing station and the other guide roller.

CROSS-REFERENCE TO RELATED APPLICATIONS

Composite strips of the type produced in the apparatus of my present invention can be utilized, for example, in apparatus disclosed in the copending application Ser. No. 511,887 filed Dec. 3, 1965 by Richard Wick et al., and in apparatus disclosed in the copending application Ser. No. 618,894 filed Feb. 27, 1967 by Heinrich Nassenstein et al. Both said copending applications are assigned to the assignee of the present application.

BACKGROUND OF THE INVENTION

The present invention relates to improvements in apparatus for trimming and splicing strips of roll film or the like end-to-end. More particularly, the invention relates to an apparatus wherein strips of roll film or the like are guided at both sides of the splicing station and are joined to form a composite strip which is thereupon collected by a takeup reel prior to further processing, particularly prior to printing of reproductions from negatives.

It is often necessary to splice strips of roll film end-to-end in such a way that the abutting edges of successive strips are in accurate alignment with each other. This is particularly important when the composite strip is guided through an enlarger or another printing machine which is used to produce and identify reproductions in a fully automatic way. Heretofore known splicing apparatus are not entirely satisfactory, mainly because a strip of roll film tends to curl transversely and/or lengthwise and does not remain in requisite position with reference to the film guides.

SUMMARY OF THE INVENTION

An object of the present invention is to provide an apparatus for trimming and joining or splicing strips of roll film or the like end-to-end in such a way that the trimmed edges of successive strips are in full alignment and abutment with each other during splicing.

Another object of the invention is to provide an apparatus which can trim the leading and trailing ends of successive strips prior to trimming.

A further object of the invention is to provide an apparatus wherein the strips of roll film or the like are guided, trimmed, advanced and otherwise manipulated in a novel and improved way.

An additional object of the invention is to provide the apparatus with novel film guides which perform multiple functions, particularly of guiding and of participating in trimming of the ends of strips, and which insure that the strips are held against curling or buckling during trimming.

A concomitant object of the invention is to provide an apparatus which can splice strips of any desired length and which can trim the ends of strips to a desired extent.

An ancillary object of tht invention is to provide an apparatus which can be operated by hand, automatically or semiautomatically.

My invention is embodied in an apparatus for trimming and joining or splicing strips of roll film or the like end-to-end. The apparatus comprises a splicing device having connecting or joining means operative to join the trailing end of a preceding strip to the leading end of a following strip, first and second guide means respectively disposed upstream and downstream of the splicing device and each defining a channel for the passage of successive strips and preferably having a width corresponding to the width of a flattened strip, third guide means disposed upstream of the first guide means and comprising a rotary guide roller having a pair of flanges spaced apart a distance corresponding to the width of a strip in flattened condition, a peripheral strip-supporting surface provided on the guide roller between the flanges, a plurality of preferably roll-shaped pressing members spaced from each other in the circumferential direction of the guide roller, and means for biasing the pressing members toward the peripheral surface so that the pressing members engage and press against the peripheral surface a strip which is trained around the guide roller.

The leading end of the strip is trimmed in response to upward movement of a carriage for the guide roller whereby a first cutting portion on a fourth guide means mounted on the carriage for the guide roller cooperates with a second cutting portion on the first guide means.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of a specific embodiment with reference to the accompanying drawing.

BRIEF DESCRIPTION OF THE DRAWING

FIG. 1 is a partly elevational and partly longitudinal vertical sectional view of an apparatus which embodies my invention;

FIG. 2 is an enlarged fragmentary transverse vertical sectional view as seen in the direction of arrows from the line II—II of FIG. 1; and FIG. 3 is an enlarged fragmentary transverse vertical sectional view as seen in the direction of arrows from the line III—III of FIG. 1.

DESCRIPTION OF THE PREFERRED EMBODIMENT

Referring first to FIG. 1, there is shown an apparatus for trimming and splicing or joining strips 13, 13A of roll film or the like, particularly for trimming and splicing exposed roll films for still cameras. The apparatus comprises a frame or main support 1 which is rigid with a first film guide including portions 2, 3 and a second film guide including portions 4, 5, 6, 7. The two film guides are in registry and each thereof defines a flat horizontal channel clearly shown in FIG. 1 whose width equals the width of a strip 13 or 13A when the latter is flattened, i.e., when the strip is held against curling or buckling in the longitudinal direction.

A third film guide or flattening means is movable up and down with reference to the frame 1 and comprises a guide roller 12 and a feed roller 11 both mounted on a carriage or slide 10 which is reciprocable up and down on vertical or nearly vertical ways or rods 10a secured to the frame 1 upstream of the first film guide 2, 3 (as considered in the direction of travel of strips 13, 13A toward a collecting device 39 which preferably assumes the form of a takeup reel and collects a composite strip assembled of two or more strips 13, 13A which are joined end-to-end). A fourth film guide includes portions 8, 9 which are mounted on the carriage 10 and define a further flat channel whose width is the same as that of the channels defined by the first and second film guides 2, 3 and 4–7. The guide roller 12 serves to introduce the leading end 13b of a strip 13 into the channel defined by the film guides 8, 9. This roller 12 is provided with two parallel flanges 12, 12b spaced apart by a distance corresponding to the width of a strip 13 or 13A in flattened condition. The peripheral surface of the roller 12 has two narrow annular portions 12c, 12d which are adjacent to the flanges 12a, 12b and engage the respective marginal portions of the strip 13 when the latter is trained around the roller 12 between the flanges. The means for flattening the film strip 13 during travel around the upper part of the roller 12 comprises two pressing members 14, 15 constituted by idler rolls which are spaced from each other in the circumferential direction of the roller 12 and are biased against the latter's peripheral surface. As shown in FIG. 2, the pressing roll 15 resembles a spool and has two ring-shaped end portions 15a, 15b which respectively maintain the corresponding marginal portions of the strip in engagement with the annular portions 12c, 12d. The other pressing roll 14 is of similar design. Thus, the guide roller 12 and pressing rolls 14, 15 cannot damage the exposed portions of successive film frames on the strip 13.

The means for biasing the pressing rolls 14, 15 against the strip 13 comprises a balance beam 16 whose fulcrum 16a is carried by one arm of a two-armed lever 17 having a pivot 17a affixed to the frame 1. The other arm of the lever 17 is biased by a spring 18 which tends to turn it in a counter-clockwise direction, as viewed in FIG. 1, whereby the rolls 14, 15 bear against the strip 13 and urge the marginal portions of the strip against the annular portions 12c, 12d on the peripheral surface of the guide roller 12.

The shaft 12e of the guide roller 12 extends from the carriage 10 and is connected with a hand wheel 19 shown in FIG. 2. This hand wheel can be replaced by a suitable motor which is not shown in the drawing.

The upper portion 8 of the fourth film guide is provided with a window or cutout 8a which enables the operator to properly locate the strip 13 prior to trimming of the leading end 13b. The position of the window 8a is preferably such that it registers with the foremost frame of the strip 13 prior to trimming of the leading end 13b. If the foremost frame is rather remote from the tip of the leading end 13b, the latter is automatically flexed downwardly by an arcuate deflector 20 which is mounted on the frame 1 below the lower portion 3 of the first film guide. A suitable collecting receptacle can be placed below the deflector 20 to accumulate scraps of the strips.

The device for trimming or severing the leading ends of successive strips comprises a first cutting edge 3a provided on the lower portion 3 of the first film guide and a complementary second cutting edge 9a provided on the lower portion of the fourth film guide. When the carriage 10 moves from its idle position which is shown in FIG. 1 to a raised position to place the channel of the fourth film guide 8, 9 into registry with the channel of the first film guide 2, 3, the cutting edges 3a, 9a automatically sever the strip 13 and the leading end 13b falls into the aforementioned collecting receptacle. The means for moving the carriage 10 from the illustrated lower level to the upper level comprises an eccentric 21 which can be rotated by hand or by means of a suitable transmission receiving motion from a motor, for example, from the aforementioned motor which may replace the hand wheel 19.

The splicing or joining device of the improved apparatus is installed downstream of the first film guide 2, 3 and upstream of the second film guide 4–7. This splicing device comprises two reels 22, 23 each of which accommodates a supply of adhesive-coated tape (respectively shown at 24 and 25) and two roller-shaped applicators or connecting members 27, 28 which respectively apply webs of tapes 24, 25 to the upper and lower sides of abutting ends of two successive strips 13, 13A. The splicing station wherein the trimmed trailing end of the preceding strip 13A abuts against the trimmed leading end of the following strip 13 is shown at 26. The splicing device further comprises one or two knives which sever the tapes 24, 25 so that the adhesive-coated material which is applied to the junction of the strips 13, 13A does not extend laterally beyond the resulting splice. The knives are preferably provided with means for marking or identifying the strip 13 and/or 13A to facilitate its detection. As a rule, the markers will be applied at both ends of each strip.

The splicing station 26 is flanked by two vertically movable flattening members 29, 30 which are respectively guided in brackets or ways 31, 32 and serve to flatten the strips 13, 13A immediately prior to and during splicing. These flattening members 29, 30 preferably resemble bars or rods extending transversely of the channels in which the strips are guided upstream and downstream of the splicing device. The means for moving the flattening members 29, 30 with reference to the brackets 31, 32 is not shown in the drawing; such means may be operated automatically or by hand. The manner in which the member 30 can flatten the trimmed trailing portion of the strip 13A is illustrated in FIG. 3 which shows that the strip 13A normally buckles or curls in the longitudinal direction of the film guide 4–7. Such buckling is eliminated when the flattening member 30 moves downwardly because the strip 13A then lies flat against the bottom surface of the channel defined by the film guide portion 5 and its edges bear against the surfaces 5a, 5b in the just mentioned channel.

A further film guide or flattening means is located downstream of the second film guide 6–7. This further film guide is preferably identical with or similar to the third film guide on the carriage 10 and comprises a guide roller 33 corresponding to the guide roller 12, two pressing rolls 34, 35, a balance beam 36, a two-armed lever 37 and a spring 38 which biases the lever 37 in a clockwise direction, as viewed in FIG. 1. The pressing rolls 34, 35 flatten the strip 13A before the latter reaches the core of the collecting reel 39. This collecting reel can be driven by hand or by means of a suitable motor or transmission, not shown. The second guide roller 33 is rotatably mounted on the frame 1 and is preferably provided with a hand wheel (not shown) corresponding to the hand wheel 19 and enabling the operator to move the strip 13A forwardly or backwards, depending on the direction of rotation of the hand wheel.

An auxiliary trimming device is adjacent to a window 45 in the second film guide 4-7. This window 45 is disposed between the film guide portions 4, 5 and 6, 7 and is preferably disposed at a level above a second collecting receptacle (not shown) which intercepts scraps constituted by severed trailing ends of successive strips. The auxiliary trimming device comprises a vertically movable cutting portion or knife 40 which can enter the window 45 and thereby cooperates with a cutting edge 6a of the film guide portion 6 to sever the trailing end 13B of the strip 13A. A second flattening device comprises a vertically movable ram 41 which flattens the trailing portion 13B prior to trimming by the cutting portions 40, 6a and which thereupon continues to move downwardly into and beyond the window 45 to withdraw the severed trailing portion 13B from the channel defined by the film guide portions 4, 5 and to cause such trailing portion to descend into the aforementioned collecting receptacle.

The operation of the improved apparatus will be readily understood on the basis of the preceding description. The trailing end 13B of the strip 13A is trimmed in the window 45 and the thus trimmed strip 13A is thereupon fed backwards by rotating the guide roller 33 in a counterclockwise direction to move the strip 13A all the way back to the splicing station 26. The leading end 13b of the strip 13 is trimmed by the cutting edges 3a, 9a when the carriage 10 moves upwardly to place the film guide 8, 9 into registry with the film guide 2, 3 and the carriage thereupon remains in such upper position until after the operator completes the feed of strip 13 to the station 26. Once the strip 13 is spliced to the strip 13A, the resulting composite strip can be transported lengthwise in response to rotation of the collecting reel 39. The carriage 10 can descend to its lower position as soon as the trailing end of the strip 13 moves into the first film guide including the portions 2 and 3. Fresh strips of exposed roll film can be threaded between the guide roller 12 and pressing rolls 14, 15 by hand.

It is clear that the improved apparatus is susceptible to many modifications without departing from the spirit of my invention. For example, each of the guide rollers 12, 33 can be associated with three or more pressing rolls or analogous pressing members. Also, one of these guide rollers can be omitted and the means for trimming the leading ends of successive strips can be provided with cutting portions which need not form part of the film guides. Furthermore, the channels defined by the film guides need not be horizontal and the apparatus may be provided with an automatic threading device which feeds successive strips to the guide roller 12. As stated before, the apparatus can be operated by hand, by a semiautomatic control system or by a fully automatic programming unit.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims.

I claim:

1. Apparatus for trimming and joining end-to-end strips of roll film or like elongated bodies having a tendency to curl so as to maintain their marginal portions at less than the maximum distance from each other, comprising a splicing device including connecting means operative to join the trailing end of a preceding strip to the leading end of a following strip; first and second guide means respectively disposed upstream and downstream of said splicing device and each defining a channel for successive strips, the width of said channels at least approximating the width of a strip in flattened condition; first flattening means for flattening a strip in at least one of said channels in the region of said splicing device so as to maintain the marginal portions of the thus flattened strip at said maximum distance from each other; and second flattening means for flattening a strip in said one channel at a point which is remote from said splicing device, said second flattening means comprising cooperating strip-engaging members defining for a strip therebetween an arcuate path whose width at least approximates said maximum distance, said strip-engaging members having narrow strip engaging surfaces which engage only the marginal portions of the strip therebetween.

2. Apparatus as defined in claim 1, wherein each of said first flattening means comprises a bar or rod extending transversely of the respective channel.

3. Apparatus as defined in claim 1, wherein said strip engaging members include idler rolls.

4. Apparatus as defined in claim 3, wherein said strip-engaging members further include a roller disposed opposite said idler rolls, said roller having two flanges flanking the marginal portions of a strip in said arcuate path and the strip-engaging surfaces of said roller being immediately adjacent to said flanges.

5. Apparatus as defined in claim 1, further comprising collecting means for collecting successive strips downstream of said second guide means.

6. Apparatus as defined in claim 5, further comprising additional flattening means substantially identical with said second flattening means and disposed between said second guide means and said collecting means.

7. Apparatus as defined in claim 5, further comprising trimming means disposed between said collecting means and said splicing device to trim the trailing end of a preceding strip prior to joining it to the leading end of the following strip.

8. Apparatus for trimming and joining strips of roll film or the like end-to-end, comprising a splicing device including connecting means operative to joint the trailing end of a preceding strip to the leading end of a following strip; a first and second guide means respectively disposed upstream and downstream of said splicing device and each defining a channel for successive strips; third guide means disposed upstream of said first guide means and comprising a rotary guide roller having a pair of flanges spaced apart a distance corresponding to the width of a strip in flattened condition thereof, said guide roller also having a peripheral strip-supporting surface between said flanges and said third guide means further comprising a plurality of pressing members spaced from each other in the circumferential direction of said guide roller and means for biasing said pressing members toward said peripheral surface so that the pressing members engage and press against said peripheral surface a strip which is trained around said guide roller and movable between first and second positions; and fourth guide means disposed between said guide roller and said first guide means and defining a further channel which registers with the channel of said first guide means in the first position of said carriage.

9. Apparatus as defined in claim 8, wherein said first and fourth guide means comprise cooperating trimming portions arranged to sever that portion of a strip which extends beyond said further channel in response to movement of said carriage to first position.

10. Apparatus as defined in claim 9, further comprising ways for guiding said carriage during movement between said first and second positions, said carriage travelling from a lower level to a higher level during movement to said first position.

11. Apparatus as defined in claim 10, further comprising deflector means for deflecting downwardly that portion of a strip which extends beyond said further channel in the second position of said carriage.

References Cited

UNITED STATES PATENTS

| | | | |
|---|---|---|---|
| 2,231,383 | 2/1941 | Goldberg | 156—509 |
| 2,645,270 | 7/1953 | Speed et al. | 156—159 |
| 3,306,801 | 2/1967 | Giles | 156—504 |

FOREIGN PATENTS

| | | | |
|---|---|---|---|
| 271,182 | 5/1913 | Germany | 156—505 |
| 671,585 | 5/1952 | Great Britain | 156—511 |
| 1,098,363 | 1/1961 | Germany | 156—506 |

ROBERT F. STAHL, Primary Examiner